(12) United States Patent
Duineveld et al.

(10) Patent No.: US 12,551,323 B2
(45) Date of Patent: Feb. 17, 2026

(54) FLUID BASED TOOTH CLEANING SYSTEM

(71) Applicant: KONINKLIJKE PHILIPS N.V., Eindhoven (NL)

(72) Inventors: Paulus Cornelis Duineveld, Drachten (NL); Maaike Cornelia Johanna Wilhelmina Van Hulten, Waalre (NL); Joldert Maria Boersma, Zuidhorn (NL); Pieter Horstman, Weert (NL); Lutz Christian Gerhardt, Eindhoven (NL); Bart Gottenbos, Budel (NL); Mark Thomas Johnson, Arendonk (BE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 991 days.

(21) Appl. No.: 17/604,398

(22) PCT Filed: Apr. 8, 2020

(86) PCT No.: PCT/EP2020/059970
§ 371 (c)(1),
(2) Date: Oct. 16, 2021

(87) PCT Pub. No.: WO2020/212214
PCT Pub. Date: Oct. 22, 2020

(65) Prior Publication Data
US 2022/0192805 A1 Jun. 23, 2022

(30) Foreign Application Priority Data
Apr. 16, 2019 (EP) .................................. 19169537

(51) Int. Cl.
*A61C 7/02* (2006.01)
*A61C 15/00* (2006.01)
(Continued)

(52) U.S. Cl.
CPC .......... *A61C 17/0202* (2013.01); *A61C 15/00* (2013.01); *A61C 17/221* (2013.01)

(58) Field of Classification Search
CPC . A61C 17/0202; A61C 17/028; A61C 17/221; A61C 17/36; A61C 17/0217;
(Continued)

(56) References Cited

U.S. PATENT DOCUMENTS 8,844,177 B2 9/2014 De Vries et al.
9,333,060 B2 5/2016 Hunter
(Continued)

FOREIGN PATENT DOCUMENTS

CN 106880416 A 6/2017
GB 258301 A 9/1926
(Continued)

OTHER PUBLICATIONS

International Search Report and Written Opinion Dated Jun. 30, 2020 for International Application No. PCT/EP2020/059970, Filed Apr. 8, 2020.
(Continued)

*Primary Examiner* — Justine R Yu
*Assistant Examiner* — Matthew R Moon (57) ABSTRACT

A fluid based tooth cleaning system includes a holdable body configured to be coupled to a head, a fluid delivery unit configured to be coupled to a nozzle within the head for emitting fluid, at least one sensor configured to provide information relating to the head with respect to a user's teeth, wherein the at least one sensor has a movement sensor for determining velocity information relating to a velocity of the head with respect to the user's teeth, and a control unit configured to utilize the velocity information from the movement sensor to enable the fluid delivery unit to emit fluid from the nozzle onto the user's teeth, and stop the fluid
(Continued)

delivery unit from emitting fluid from the nozzle when a velocity of the head is greater than a first threshold level and/or is less than a second threshold level.

14 Claims, 9 Drawing Sheets

(51) Int. Cl.
  *A61C 17/02* (2006.01)
  *A61C 17/22* (2006.01)
(58) Field of Classification Search
  CPC .. A61C 17/032; G16H 20/40; A46B 15/0006; A46B 15/0012; A46B 15/0004; A46B 15/0002
  See application file for complete search history.

(56) References Cited

U.S. PATENT DOCUMENTS

| | | | |
|---|---|---|---|
| 9,814,302 B2 | 11/2017 | Follows et al. | |
| 9,987,109 B2 | 6/2018 | Sokol et al. | |
| 10,010,388 B2 | 7/2018 | Gharib et al. | |
| 10,064,711 B1* | 9/2018 | Richter | A61C 17/221 |
| 10,130,452 B2 | 11/2018 | Baragona et al. | |
| 10,426,254 B2 | 10/2019 | Hardeman et al. | |
| 10,595,626 B2 | 3/2020 | Jeanne et al. | |
| 10,624,449 B2 | 4/2020 | Zijlstra et al. | |
| 10,874,493 B2* | 12/2020 | Vetter | A46B 15/0002 |
| 10,952,528 B2 | 3/2021 | Jeanne et al. | |
| 11,278,384 B2* | 3/2022 | Serval | A61C 19/04 |
| 2007/0248932 A1* | 10/2007 | Gharib | A61C 17/0202 433/81 |
| 2009/0092949 A1 | 4/2009 | Duineveld | |
| 2013/0125427 A1 | 5/2013 | De Vries et al. | |
| 2014/0127641 A1 | 5/2014 | Hilscher et al. | |
| 2015/0265384 A1 | 9/2015 | Intlekofer et al. | |
| 2016/0331117 A1 | 11/2016 | Follows | |
| 2017/0116665 A1 | 4/2017 | Alzahrani | |
| 2018/0368567 A1* | 12/2018 | Buil | A46B 15/0036 |
| 2020/0202520 A1* | 6/2020 | Joyce | G06N 5/04 |

FOREIGN PATENT DOCUMENTS

| | | |
|---|---|---|
| GB | 2538301 A | 11/2016 |
| JP | 6152604 B1 | 6/2017 |
| WO | WO2017/002012 A1 | 1/2017 |

OTHER PUBLICATIONS

Cense. "A spray based method for biofilm removal" by A. Cense (Eindhoven University, 2005, sponsored by Philips Research.

* cited by examiner

FLUID BASED TOOTH CLEANING SYSTEM

This application is the U.S. National Phase application under 35 U.S.C. § 371 of International Application No. PCT/EP2020/059970, filed on Apr. 8, 2020, which claims the benefit of European Application Serial No. 19169537.8, filed Apr. 16, 2019.

FIELD OF THE INVENTION

The present invention relates to a fluid based tooth cleaning system, and to a method of cleaning a user's teeth with a fluid based tooth cleaning system, as well as to a computer program element and a computer readable medium.

BACKGROUND OF THE INVENTION

GB2538301 discloses a dental cleaning appliance comprising a handle; a fluid delivery system for delivering a burst of working fluid to the teeth of a user, at least part (e.g. a nozzle) of the fluid delivery system being moveable relative to the handle as the appliance is moved along the teeth of the user; a sensor for providing an output which varies with movement of said at least part of the fluid delivery system relative to the handle; and a control circuit for actuating the delivery of working fluid to the teeth of the user depending on the output from the sensor.

When using hybrid waterfloss/brush products, users can experience too much water being provided into the mouth while brushing and flossing at the same time, if the interdental jet is running continuously—see for example U.S. Pat. Nos. 9,987,109 and 9,814,302. Additionally, large fluid reservoirs are required making devices bulky and tethered, and the important action of fluoride from the toothpaste is strongly diminished due to the large amounts of fluid. Furthermore, when the brush is moved too fast, the flossing action does not work properly due to jetting at the teeth instead of between the teeth.

SUMMARY OF THE INVENTION

It would be advantageous to have improved means for cleaning teeth with a flossing device and/or a hybrid floss/toothbrush.

The object of the present invention is solved with the subject matter of the independent claims, wherein further embodiments are incorporated in the dependent claims. It should be noted that the following described aspects and examples of the invention apply also to the fluid based tooth cleaning system, and the method of cleaning a user's teeth with a fluid based tooth cleaning system, as well as for the computer program element and computer readable medium.

In a first aspect, there is provided a fluid based tooth cleaning system comprising a holdable body; a fluid delivery unit; at least one sensor; and a control unit. The holdable body is configured to be coupled to a head. The fluid delivery unit is configured to be coupled to a nozzle configured to emit fluid. The nozzle is comprised within the head. The at least one sensor provides to the control unit, information relating to the head with respect to a user's teeth. The control unit utilizes the information to enable the fluid delivery unit to emit fluid from the nozzle onto the user's teeth.

In accordance with the invention, the at least one sensor comprises a movement sensor configured to determine velocity information relating to a velocity of the head with respect to the user's teeth. In this manner, velocity information can be used to regulate the liquid flow to the teeth.

The velocity information can also be used to determine a position, for example when a base location, such as an interdental spacing has been located. Movement away from that base position with a velocity can then be transformed into a distance, and in this way it can be determined when a head has moved away from an interdental spacing, and when the head has moved back to that interdental spacing, for example. Also, with knowledge of an average tooth size, if an interdental spacing for example has been detected, then lateral movement at a detected velocity can be converted into a distance equal to an expected adjacent interdental spacing. Then, the nozzle can emit a jet of fluid at this new location, and/or start the process of detecting an interdental spacing in the locality where such an interdental spacing is expected to be located. Thus, the nozzle can then emit a flossing jet at the next interdental space. Thus, jetting is enabled based on a prediction or anticipation, that accounts for time lag in systems that would otherwise not enable jetting at precise locations, such as interdental spaces.

In other words, an oral cleaning device senses the head of e.g. a toothbrush or flossing device with respect to a user's teeth, and uses this information to regulate a fluid jet onto the user's teeth. In this manner, the fluid jet is regulated based on the output of the sensor so that less cleaning fluid, such as water, is required. This means that less fluid accumulates in the user's mouth, leading to a more comfortable cleaning solution, and a fluid reservoir can be much smaller than previously required, and can even be located within a handle of the oral cleaning device.

In an example, the control unit is configured to control the fluid delivery unit to regulate the fluid flow from the nozzle based on the output of one or more sensors of the at least one sensor.

In an example, the control unit is configured to enable the fluid delivery unit to emit fluid from the nozzle when the head is located at a position such that the fluid is directed to hit an interdental space of the user's teeth.

In other words, the nozzle is only emitting a jet of flossing fluid at the right time, when the fluid emitting nozzle is pointing in the correct direction.

In an example, the control unit is configured to control the user interface unit to output information to the user regarding movement of the head.

In other words, the system enables a user's behavior to be modified, in that the user is provided with feedback to enable the user to locate the holdable body such as a toothbrush effectively with respect to the teeth in order that a flossing jet is directed in the right direction, that being towards the interdental spacing and, if necessary, also towards the gum line. Thus, for example, the user can be provided with feedback that enables the user to move the holdable body in a manner such that the flossing jet is directed as required.

In an example, the control unit is configured to utilize the information relating to the head with respect to the user's teeth to stop the fluid delivery unit from emitting fluid from the nozzle when the head is located at a position such that the fluid would be directed to hit a surface of the user's teeth. Thus, the flossing jet is not then emitted at a location, for example at occlusal sides, where it is not required to be directed. It is then enabled to jet exactly, and indeed only, at locations in-between two teeth (interdental/interproximal) and/or close to the gum line towards sub-gingival pockets.

In an example, the at least one sensor comprises a position (i.e., orientation and location) sensor configured to determine positional information relating to the head with respect to the user's teeth.

In an example, the positional information comprises information relating to when the head is located at a position such that the nozzle is located adjacent to an interdental space of the user's teeth. In this manner, the holdable body such as a toothbrush senses when its jetting nozzle is pointing in the required direction, enabling the flossing jet to effectively clean the interdental spacing and, if necessary, also the gum line.

In an example, the positional information comprises information relating to when the head is located at a position such that the nozzle is located adjacent to a gum line of the user's teeth.

In an example, the control unit is configured to utilize the positional information to determine a position of a first interdental space and utilize the velocity information to determine when the head having moved away from that position returns to that position. The control unit is configured to activate the fluid delivery unit to emit fluid from the nozzle when the head has returned to the position of the first interdental space. In this manner, an interdental space can be detected, but there can be time lag before the fluid delivery unit can activate an emit a jet of flossing fluid from its nozzle, and the head may have moved laterally before a flossing jet can be emitted. Thus, by detecting an interdental spacing, that location can be logged, and then as the head is moved around, the velocity information is converted into location information relative to the detected interdental spacing. Thus, when the head starts to approach the detected interdental spacing, the fluid delivery unit can already be charged or charging and immediately direct a flossing jet in the correct direction.

In an example, the control unit is configured to utilize the positional information to determine a position of a first interdental space and utilize the velocity information to determine when the head has moved to a position of a second interdental space adjacent to the first interdental space. The control unit is configured to activate the fluid delivery unit to emit fluid from the nozzle when the head is located at the second interdental space. In this manner, an interdental space can be detected, but there can be time lag before the fluid delivery unit can activate an emit a jet of flossing fluid from its nozzle, and the head of e.g. a toothbrush may have moved laterally before a flossing jet can be emitted. Thus, by detecting an interdental spacing, that location can be logged and then as the head is moved around, the velocity information is converted into location information relative to the detected interdental spacing. Knowledge of size of teeth can then be used to estimate when the head is approaching an adjacent interdental spacing, and the fluid delivery unit can be charged or charging in preparation to emit a flossing jet at the next interdental space, for example when it is detected.

In an example, the control unit is configured to utilize the velocity information to stop the fluid delivery unit from emitting fluid from the nozzle when a velocity of the head is greater than a first threshold level and/or is less than a second threshold level. In this manner, when the head of e.g. a toothbrush is moving too fast to effectively clean an interdental spacing, flossing jetting does not occur, and likewise flossing jetting does not occur if the head is moving too slowly, as this could lead to too great a quantity of fluid being emitted.

In an example, the information output by the user interface unit comprises the output of information that the velocity of the head is greater than a first threshold level and/or is less than a second threshold level. In this manner, the user can be taught, through appropriate feedback, that they are moving the holdable body (such as a toothbrush), and thereby the head with the nozzle, too quickly for effective flossing cleaning, or likewise that they are moving the holdable body too slowly. Thus, this leads to the user more correctly using the fluid based tooth cleaning system.

In an example, the control unit is configured to enable the fluid delivery unit to emit fluid from the nozzle with one or more adapted parameters of: speed of fluid jet, frequency of fluid jet, duration of fluid jet, pressure of fluid, flow rate of fluid.

In an embodiment, the holdable body comprises the fluid delivery unit, the at least one sensor, and the control unit. The control unit utilizes the information to enable the fluid delivery unit to emit fluid from the nozzle when the nozzle is at one location out of one or more specific locations with respect to the user's teeth.

In another aspect, there is provided a method of cleaning a user's teeth with a fluid based tooth cleaning system. The fluid based tooth cleaning system comprises: a holdable body configured to be coupled to a head; a fluid delivery unit configured to be coupled to a nozzle within the head, the nozzle being configured to emit fluid; at least one sensor; and a control unit. The method comprises:

providing, to the control unit, by the at least one sensor, information relating to the head with respect to the user's teeth, including velocity information relating to a velocity of the head with respect to the user's teeth; and utilizing by the control unit, the information to enable the fluid delivery unit to emit fluid from the nozzle onto the user's teeth.

According to yet another aspect, there is provided a computer program element controlling a system as previously described, which, if the computer program element is executed by a processing unit, is adapted to perform the method steps as previously described.

According to another aspect, there is provided a computer readable medium having stored the computer program element as previously described. The computer program element can for example be a software program but can also be a FPGA, a PLD or any other appropriate digital means.

Advantageously, the examples of, and benefits provided by, any of the above aspects equally apply to all of the other aspects and vice versa.

The above aspects and examples will become apparent from and be elucidated with reference to the embodiments described hereinafter.

BRIEF DESCRIPTION OF THE DRAWINGS

Exemplary embodiments will be described in the following with reference to the following drawings.

DETAILED DESCRIPTION OF EMBODIMENTS

Figure 1:
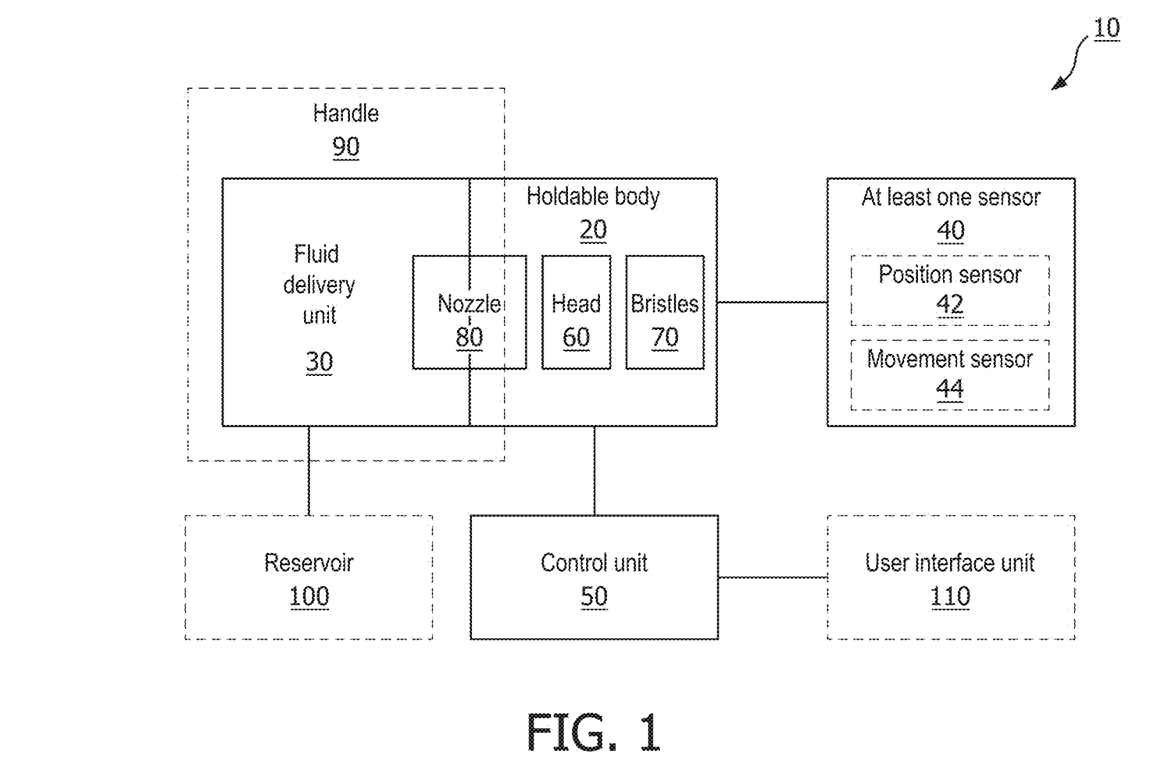
FIG. 1 shows a schematic set up of an example of a floss based tooth cleaning system.

FIG. 1 shows an example of a fluid based and tooth cleaning system 10. The system comprises a holdable body 20, a fluid delivery unit 30, at least one sensor 40, and a control unit 50. The holdable body 20 is configured to be coupled to a head 60. The head 60 can optionally have bristles 70, or optionally rubber pads, foams, a polishing sheet or other suitable cleaning elements that in addition to flossing by fluid provides cleaning of teeth. Thus, the system 10 can optionally be a hybrid fluid based and toothbrush cleaning system. The fluid delivery unit 30 is configured to be coupled to a nozzle 80 configured to emit fluid, and the nozzle 80 is comprised within the head 60. The at least one sensor 40 provides information relating to the head of the holdable body 20 with respect to a user's teeth. The control unit 50 utilizes the information to enable the fluid delivery unit to emit fluid from the nozzle onto the user's teeth. According to the invention, the at least one sensor comprises a movement sensor 44 configured to determine velocity information relating to a velocity of the head 60 with respect to the user's teeth. In an example, the movement sensor 44 comprises an inertial measurement unit.

In an example, the holdable body 20 is a toothbrush body.

In an example, the fluid delivery unit 30 is comprised within the holdable body 20. In an example, the fluid delivery unit 30 is comprised within a handle 90 of the holdable body 20.

In an example, the control unit 50 is comprised within the holdable body 20. In an example, the control unit 50 is comprised within a handle 90 of the holdable body 20.

In an example, the fluid based tooth cleaning system 10 comprises a reservoir 100 configured to hold the fluid, and the reservoir 100 is in fluid communication with the fluid delivery unit 30. In an example, the reservoir 100 is comprised within the holdable body 20. In an example, the reservoir 100 is comprised within a handle 90 of the holdable body 20.

In an example, the fluid is a liquid. In an example, the fluid is a gas. In an example, the fluid is a liquid/gas mixture. In an example, the fluid emitted from the nozzle 80 comprises a jet of fluid. In another example, the fluid emitted from the nozzle 80 comprises a spray of fluid.

According to an example, the control unit 50 is configured to enable the fluid delivery unit 30 to regulate the fluid flow from the nozzle 80 based on the output of one or more sensors of the at least one sensor.

According to an example, the control unit 50 is configured to enable the fluid delivery unit 30 to emit fluid from the nozzle 80 when the head 60 is located at a position such that the fluid is directed to hit an interdental space of the user's teeth.

In an example, the control unit 50 is configured to enable the fluid delivery unit 30 to emit fluid from the nozzle 80 when the head 60 is located at a position such that the fluid is directed to hit a gum line of the user's teeth.

According to an example, the system comprises a user interface unit 110. The control unit 50 is configured to control the user interface unit 110 to output information to the user regarding movement of the head 60.

In an example, the user interface unit 110 is comprised within the holdable body 20.

In an example, the user interface unit 110 is comprised within a remote device 120. In an example, the remote device 120 is one of: a mobile telephone, a tablet, a computer, a remote server.

In an example, the information output to the user comprises an audible signal. In an example, the audible signal is emitted from the holdable body 20. In an example, the audible signal is emitted by the remote device 120.

In an example, the information output to the user comprises a haptic signal. In an example, the haptic signal relates to a vibration of the holdable body 20. In an example, the haptic signal relates to a vibration of the remote device 120.

In an example, the information output to the user comprises a visible signal. In an example, the visible signal relates to a colored light being emitted by at least one part of the holdable body 20. In an example, the visible signal relates to a colored light being emitted by a screen 130 of the remote device 120.

According to an example, the control unit 50 is configured to utilize the information relating to the head 60 with respect to the user's teeth to stop the fluid delivery unit 30 from emitting fluid from the nozzle 80 when the head 60 is located at a position such that the fluid would be directed to hit a surface of the user's teeth.

According to an example, the at least one sensor 40 comprises a position sensor 42 configured to determine positional information relating to the head 60 with respect to the user's teeth.

According to an example, the positional information comprises information relating to when the head 60 is located at a position such that the nozzle 80 is located adjacent to an interdental space of the user's teeth.

According to an example, the positional information comprises information relating to when the head 60 is located at a position such that the nozzle 80 is located adjacent to a gum line of the user's teeth.

In an example, the position sensor 42 comprises a fluid pressure sensor.

According to an example, the control unit 50 is configured to utilize the positional information to determine a position of a first interdental space, and utilize the velocity information to determine when the head 60 having moved away from that position returns to that position. The control unit 50 is configured to activate the fluid delivery unit 30 to emit fluid from the nozzle 80 when the head 60 has returned to the position of the first interdental space.

According to an example, the control unit 50 is configured to utilize the positional information to determine a position of a first interdental space, and utilize the velocity information to determine when the head 60 has moved to a position of a second interdental space adjacent to the first interdental space. The control unit 50 is configured to activate the fluid delivery unit 30 to emit fluid from the nozzle 80 when the head 60 is located at the second interdental space.

According to an example, the control unit 50 is configured to utilize the velocity information to stop the fluid delivery unit 30 from emitting fluid from the nozzle 80 when a velocity of the head 60 is greater than a first threshold level and/or is less than a second threshold level.

According to an example, the information output by the user interface unit 110 comprises the output of information that the velocity of the head 60 is greater than a first threshold level and/or is less than a second threshold level.

In an example, the information comprises an audible, haptic and/or visible signal. In an example, the signal relating to the first threshold is different to the signal relating to the second threshold.

According to an example, the control unit 50 is configured to enable the fluid delivery unit 30 to emit fluid from the nozzle 80 with one or more adapted parameters of: speed of fluid jet, frequency of fluid jet, duration of fluid jet.

In an example, the holdable body 20 comprises the fluid delivery unit 30, the at least one sensor 40, and the control unit 50. The control unit 50 is configured to utilize the information to enable the fluid delivery unit 30 to emit fluid from the nozzle 80 when the nozzle 80 is at one location out of one or more specific locations with respect to the user's teeth.

Figure 2:
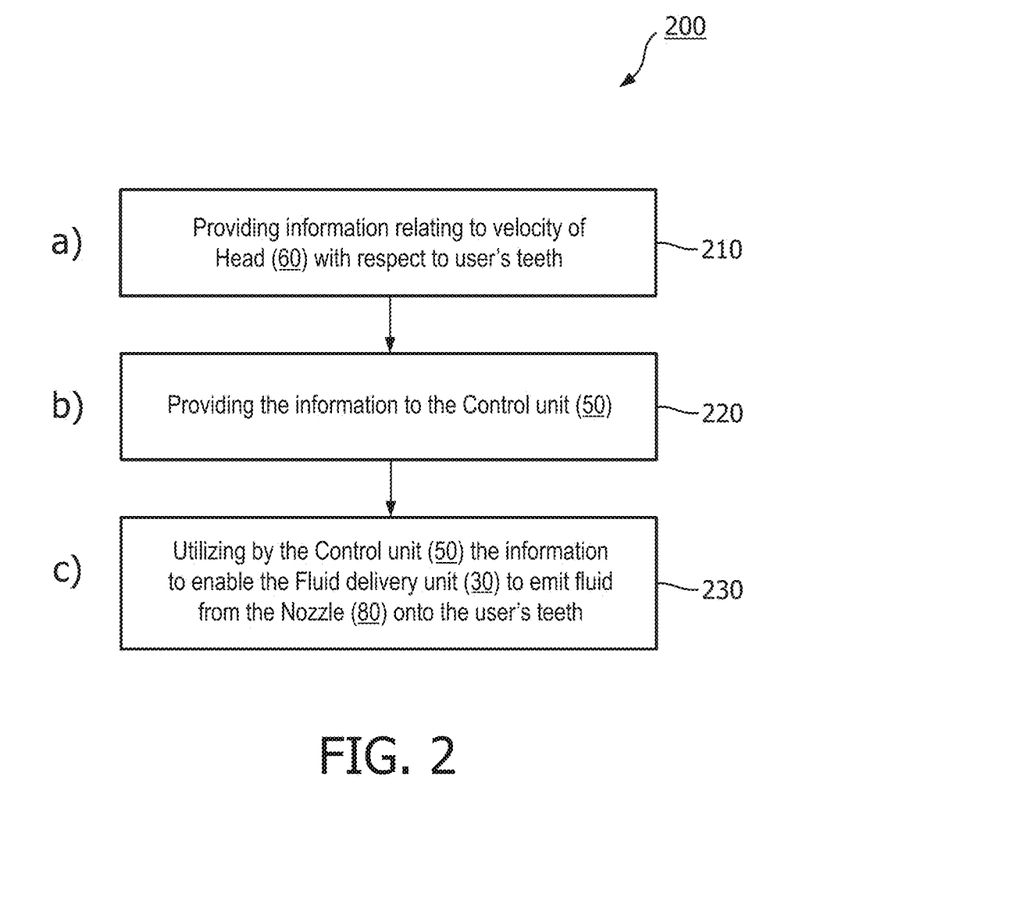
FIG. 2 shows a method of cleaning a user's teeth with a floss based tooth cleaning system.

FIG. 2 shows a method 200 of cleaning a user's teeth with the fluid based and tooth cleaning system 10 in its basic steps. The method 200 comprises:

in a providing step 210, providing by the at least one sensor 40, 44, information relating to the head 60 with respect to the user's teeth, including velocity information relating to a velocity of the head 60 with respect to the user's teeth;

in a providing step 220, providing by the at least one sensor 40, 44, the information to the control unit; and in a utilizing step 230, utilizing by the control unit 50, the information to enable the fluid delivery unit 30 to emit fluid from the nozzle 30 onto the user's teeth.

In an example, utilizing step 230 comprises utilizing by the control unit 50 the information to enable the fluid delivery unit 30 to emit fluid from the nozzle 80 when the head 60 is located at a position such that the fluid is directed to hit a gum line of the user's teeth.

In an example, the fluid based tooth cleaning system 10 comprises a user interface unit 110, and in utilizing step 230, the control unit 50 controls the user interface unit 110 to output information to the user regarding movement of the head 60.

In an example, utilizing step 230 comprises utilizing by the control unit 50 the information to stop the fluid delivery unit 30 from emitting fluid from the nozzle 80 when the head 60 is located at a position such that the fluid would be directed to hit a surface of the user's teeth.

In an example, utilizing step 230 comprises utilizing by the control unit 50 the positional information to determine a position of a first interdental space, and utilizing the velocity information to determine when the head 60 having moved away from that position returns to that position, and wherein the control unit 50 activates the fluid delivery unit 30 to emit fluid from the nozzle when the head 60 has returned to the position of the first interdental space.

In an example, utilizing step 230 comprises utilizing by the control unit 50, the positional information to determine a position of a first interdental space, and utilizing the velocity information to determine when the head 60 has moved to a position of a second interdental space adjacent to the first interdental space, and wherein the control unit 50 activates the fluid delivery unit 30 to emit fluid from the nozzle 80 when the head 60 is located at the second interdental space.

In an example, utilizing step 230 comprises the control unit 50 utilizing the velocity information to stop the fluid delivery unit 30 from emitting fluid from the nozzle 80 when a velocity of the head 60 is greater than a first threshold level and/or is less than a second threshold level.

In an example, utilizing step 230 comprises the user interface unit 110 outputting information that the velocity of the head 60 is greater than the first threshold level and/or is less than the second threshold level. As mentioned above, the information may comprise an audible, haptic, and/or visible signal, and the signal relating to the first threshold may be different to the signal relating to the second threshold.

The fluid based tooth cleaning system 10, and associated method of cleaning a user's teeth are now additionally described specific detail with reference to FIGS. 3-11, in relation to specific detailed embodiments. Here, the specific embodiments relate to a hybrid fluid based and mechanical tooth cleaning system, where the jetting nozzle is within a head of a toothbrush, with for example bristles. However, it will be understood that the jetting action is not required to be linked to a toothbrush having bristles, and could be utilized as a stand-alone jet flossing device. The embodiments described here, therefore relate to a specific embodiment type.

Figure 3:
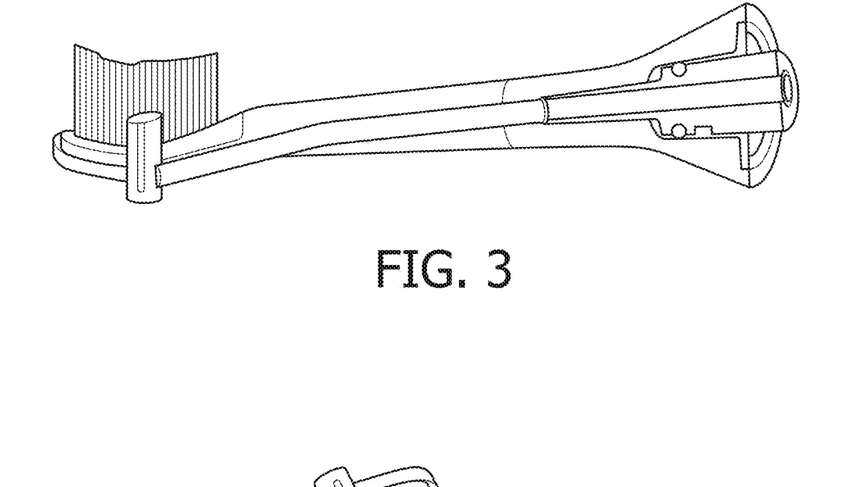
FIG. 3 shows an example of a hybrid floss and toothbrush.
Figure 4:
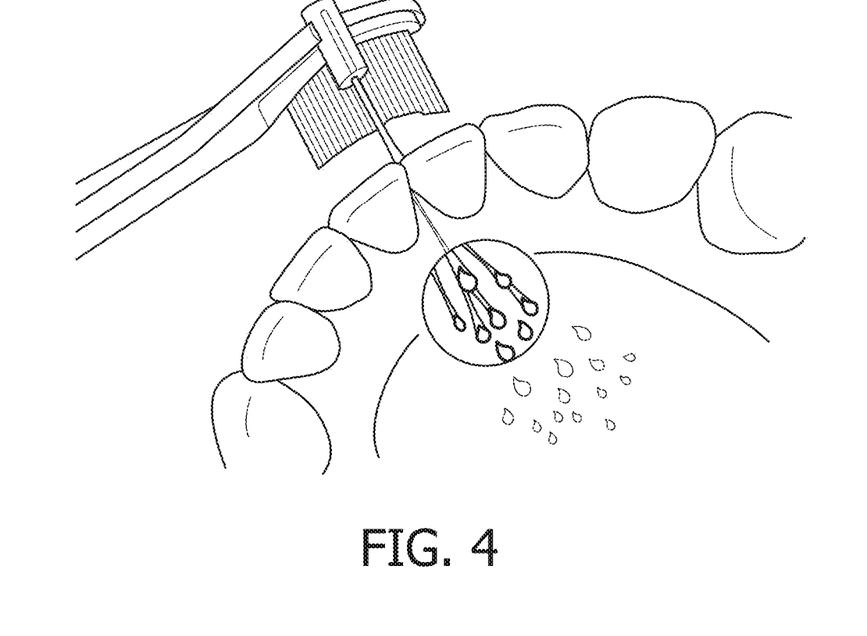
FIG. 4 shows an example of a hybrid floss and toothbrush in operation.

FIGS. 3-4 show an exemplar hybrid fluid based and mechanical tooth cleaning system, that can also be referred to as a hybrid floss and toothbrush. This relates to an oral cleaning device with combined tooth brushing and interdental space flossing functionalities, using fluid in the form of liquid (e.g. water) or gas (e.g. air) or a mixture of both. The fluid jetting action is greatly improved, when made specific to the interdental space. For example, sensor systems as described in U.S. Pat. No. 9,987,109 and/or U.S. Pat. No. 9,814,302 can be used to determine the location of an interdental space. During a brushing routine, different sides of the tooth surface are cleaned (e.g. buccal, lingual and occlusal). Combining brushing and jetting in one device can improve interdental cleaning as both the buccal and lingual sides of the interdental space are reached. Sensors to determine the location (position and orientation) of the head of the toothbrush with respect to the user's teeth are described for example in WO2017/002004A1, WO2017/001399A1, WO2017/002012A1, and WO2016/174621A1.

In an example of the combined brushing and flossing device described here, fluid delivery occurs when the interdental space or gum line is detected, using sensor means as discussed above, and the nozzle exit is facing the interdental spacing or gum line. Additionally, when a user moves the brush too fast, such as during scrubbing, the detection-jetting loop disables the jet firing, because the nozzle is already moved to a different location and not facing the interdental spacing or gum line anymore. Thus, in the power toothbrush that has a combined or hybrid flossing and brushing functionality, an automated jetting system is provided that automatically jets when the nozzle is pointing at the interdental space and gum line, with a motion measuring sensor in the toothbrush, in the form of an accelerometer, that measures a speed of the device relative to the tooth arch. Once the device exceeds a threshold brushing speed/acceleration, the fluid jetting action is interrupted, stopping the pump to pump or close a valve because jetting during such movement is ineffective. Also, the liquid flow rate is reduced when the speed of the toothbrush is reduced. When the speed of the toothbrush is too low, cleaning is effective but at the cost of too much liquid being injected into the mouth, and therefore again when the toothbrush head speed falls below a threshold, the jetting action is interrupted. In other words, the liquid flow rate can be regulated to the speed of the brushhead.

Figure 5:
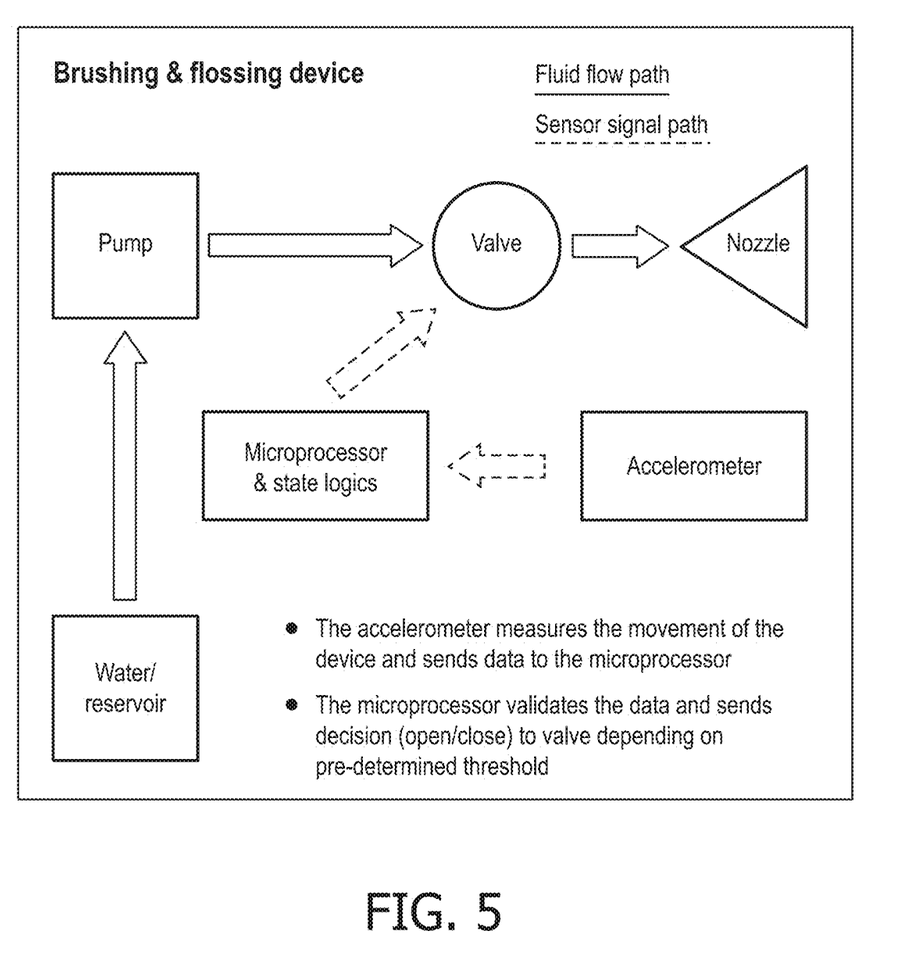
FIG. 5 shows a detailed example of operational part interactions of an exemplar hybrid floss and toothbrush system.

FIG. 5 shows a detailed example of operational part interactions of an exemplar hybrid fluid based and mechanical tooth cleaning system (hybrid floss and toothbrush system). In overview, the system has a control loop, with brushing motion detected/measured and taken as an input parameter to switch off/on jetting mode (valve opening/closing). In this embodiment interruption of jetting occurs if an upper brushing speed threshold is exceeded, or if a brushing speed goes lower than a threshold. Thus, continuous jetting is stopped when the movement of the brush/speed of the brush is detected to be outside of the brushing speed limits. In FIG. 5, the arrows from water reservoir to pump to valve and to nozzle correspond to the fluid flow path, and the arrows from the accelerometer to the microprocessor and state logics to the valve correspond to the sensor signal path. It is to be noted, that the arrangement shown is just one exemplar embodiment, and for example the pump can be regulated directly by the microprocessor and power control without a valve, via for example a burst mode of operation.

Figure 6:
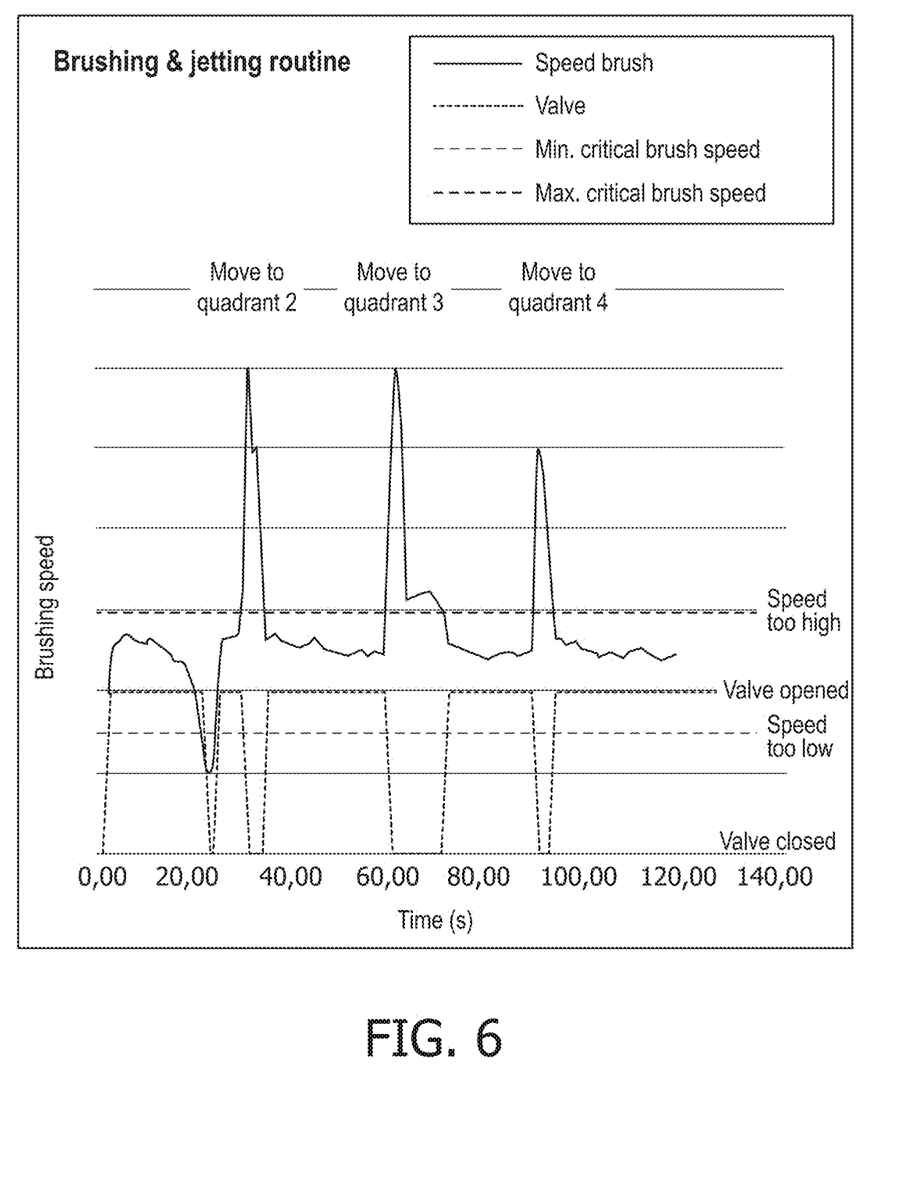
FIG. 6 shows an exemplar flossing and brushing routine for the exemplar system of FIG. 5.

As shown in FIG. 5, the hybrid flossing/toothbrush system comprises a pump, water reservoir, motion sensor capability (accelerometer), microprocessor and valves. A jetting function is also integrated in the device (including but not limited by a water reservoir, pump, tubing, nozzle and valves) with this helping to improve the cleaning experience. A feedback loop is provided for the water jet system, which stops at a certain brushing speed and starts jetting again when the speed is back to a lower level, and the accelerometer measuring the speed/movement of the brush. The valve can be controlled via a microprocessor. The operation of the feedback loop is shown in FIG. 6, which shows an exemplar flossing and brushing routine where the flossing jetting is turned off as the brush is moved too quickly or too slowly. Additionally, as discussed above even when the toothbrush is moving within the correct speed thresholds, the flossing jetting is only occurring when the jet nozzle is pointing at the interdental spacing or gum line. In the flossing and brushing routine shown in FIG. 6, a typical two minutes' oral hygiene cleaning session is shown. Every 30 seconds an acoustic signal is given by the device, which makes the user switch quadrants (the brush will move fast). This is visible in the graph by a peak in the brushing speed (upper continuous line) which makes the valve close when the speed exceeds a threshold, and the jetting stop (bottom continuous line). Once the speed is within boundary conditions, the valve opens again and the jetting continues. However, if the brush speed is too low the valve also closes.

Furthermore, feedback to the user is given as an acoustic noise (buzz), light signal, software feedback (e.g. in-app signals) or vibration as soon as the movement is too fast and the valve is closed. Another signal is given to the user when the optimal speed is reached to encourage the user to continue with this speed. A further signal is given to the user, when the speed is too slow. This feature will educate and/or coach the user to improve his or hers brushing behavior. Acoustic, scrubbing and in-app feedback is also present in the toothbrush.

Figure 7:
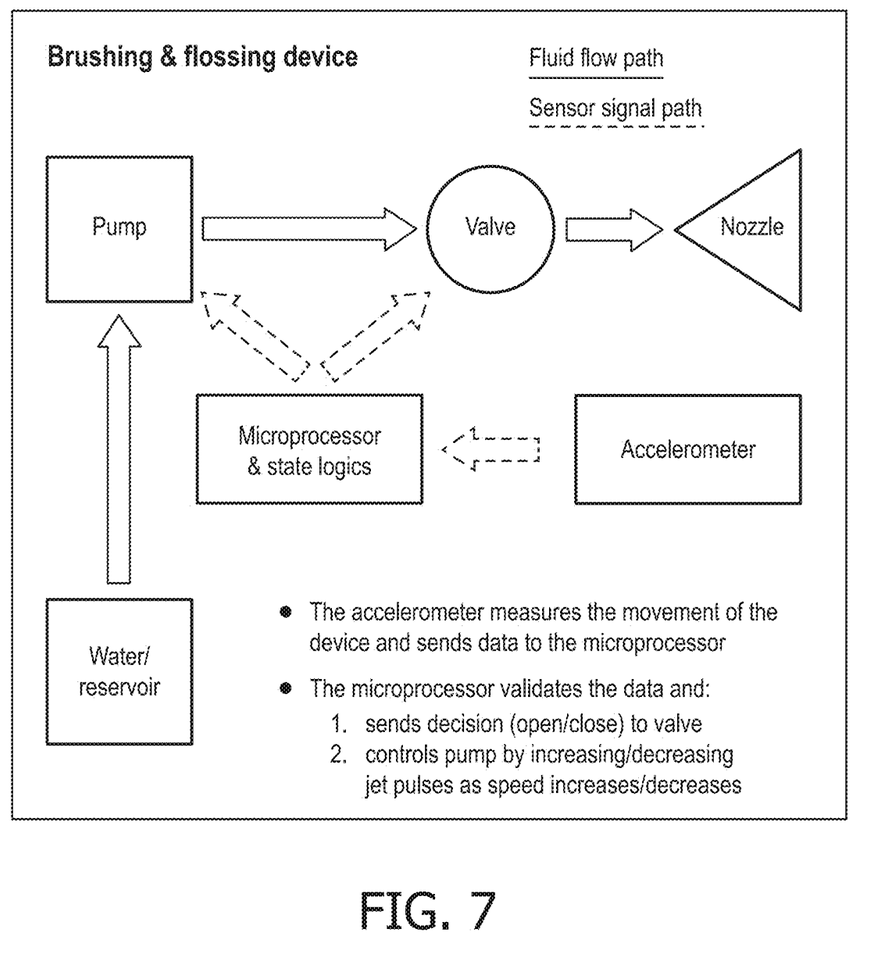
FIG. 7 shows a detailed example of operational part interactions of an exemplar hybrid floss and toothbrush system.

FIG. 7 shows a detailed example of operational part interactions of an exemplar hybrid floss and toothbrush system. In overview the system has an adaptive control loop, where brushing motion is detected/measured and taken as an input parameter to adapt the jetting settings of the pump (speed, pulse duration etc.). Thus, jetting speed or pulse rate is adapted with increasing brushing motion. In FIG. 7, the arrows from water reservoir to pump to valve and to nozzle correspond to the fluid flow path, and the arrows from the accelerometer to the microprocessor and state logics to the pump/valve correspond to the sensor signal path. In this system, the fluid jetting speed or flow (rate) is adjusted to the brushing speed to accommodate an improved cleaning process. The movement of the brush can be used as input to adapt the speed of jetting: the faster the brush is moved, the faster the jetting takes place. This can be enabled through the use of an adaptive control loop comprising a suitable controller (e.g. proportional controller or PID controller if more stability is needed) and a scrubbing motion sensor. Again, if movement is too fast, jetting will be stopped. The microprocessor is programmed such that it will not only be able to decide if the valve needs to close or not, it will also adapt the speed of the jet to the speed of the movement of the brush. Again, the arrangement shown is just one exemplar embodiment, and for example the pump can be regulated directly by the microprocessor and power control without a valve, via for example a burst mode of operation.

The systems of FIGS. 5 and 7 can have the same structural features, with the microprocessor being programmed differently, or being able to switch between modes of operation.

Figure 8:
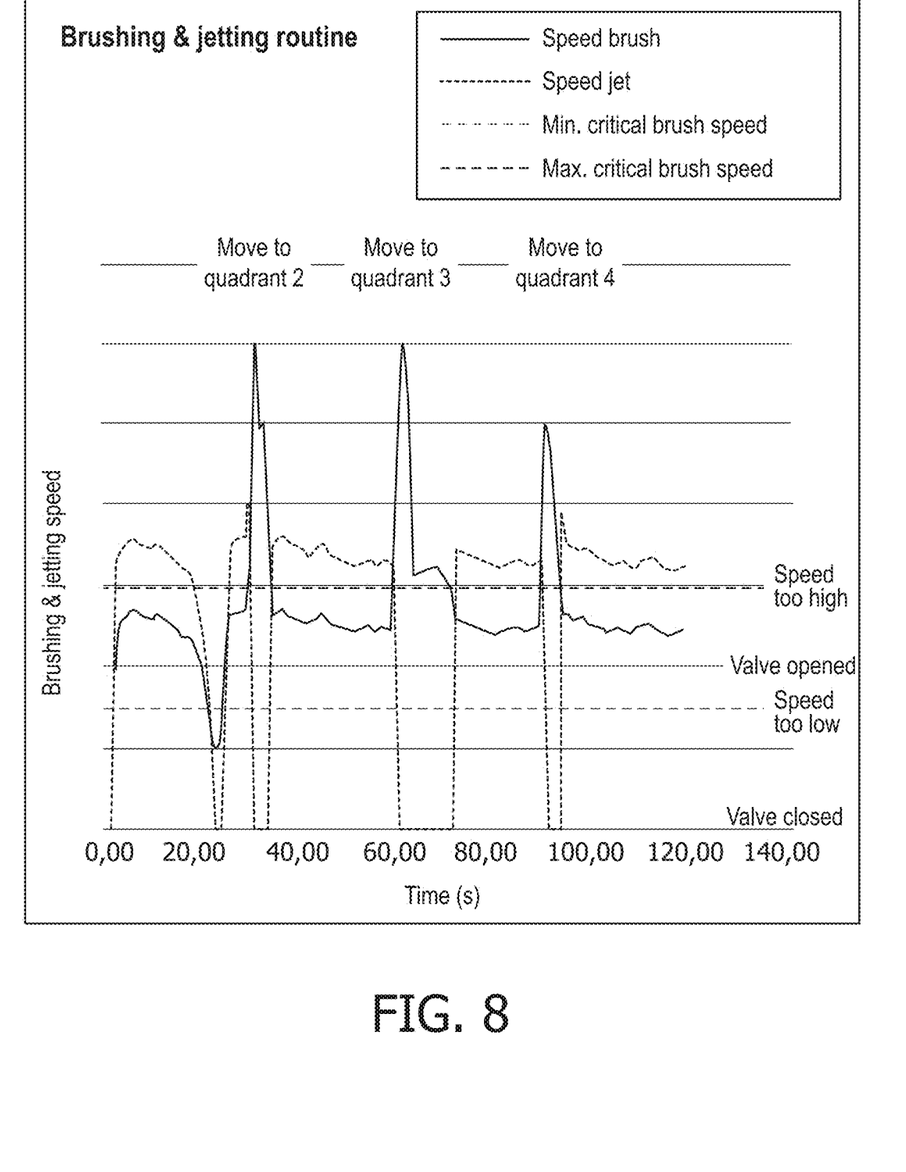
FIG. 8 shows an exemplar flossing and brushing routine for the exemplar system of FIG. 7.

The operation of the feedback loop is shown in FIG. 8, which shows an exemplar flossing and brushing routine. A typical two minutes' oral hygiene cleaning session is shown. Every 30 seconds an acoustic signal is given by the device, which makes the user switch quadrants. This is visible in the graph by a peak in the brushing speed, which makes the valve close and the jetting to stop, when a threshold is exceeded. Regarding the jetting speed, the faster the brush moves, the faster the jet jets. Once the speed of the brush is within the upper and lower threshold, the valve opens again and the jetting continues. The faster the brush is moved the faster the jetting takes place as the interdental spaces are reached quicker the interdental cleaning will be more efficient and effective.

There are however, two factors that make the correct jetting during fast brush motion challenging:
 The response of the interproximal sensor is too slow;
 Initiation of the jetting procedure takes too long.

For example, an interdental or interproximal space or gum line can be detected, using sensor technology referred to above, but before the detection is confirmed and/or the jet unit is ready to jet fluid due to movement of the brush head the jetting tip or nozzle can already have moved beyond the interproximal space and jetting will be ineffective.

Thus, in addition to the above described solutions, a modified form of jetting may still be activated during a scrubbing period. This involves using the detection of the previous interdental space—in combination with the speed of movement of the brush—to time the jetting burst for the moment when the jet tip reaches the next interproximal space. In such a manner, at least some effective jetting may be carried out on at least some of the interproximal spaces. The first interproximal space after scrubbing starts can be missed if the brush is moved in one direction only, but if an interdental space is detected then as the user moves the brush back and forward, the nozzle can move back to the previously detected interdental space and jet.

Thus, operation can be summarized as follows:
 Scrubbing is detected at a speed which is too high for interproximal sensing of the present interproximal space, but which is within the range where effective jetting could occur;
 Device switches into a mode where jetting is suspended for the first interproximal space;
 After interproximal space sensing, a delay is introduced after which the jetting is activated. Thus jetting occurs at the position of the next interproximal space.

The delay is defined by the time needed for the probe to move from the sensing point (beyond the first interproximal space) to the next space. This is defined by the scrubbing speed (which is already measured), and the spacing between interproximal spaces. The latter could in a simple embodiment just be an average interproximal spacing (around 7-8 mm). However, the system can take into account the brush position in the mouth to define the interproximal spacing (larger for molars). In still a further system the repeated measurement of interproximal spaces can be used to still further personalize the delay, for example using the space sensing to define exactly where you are in the mouth, where the brush is moving and hence the delay to the next interproximal space.

As discussed above, movement and speed of the toothbrush head is an input utilized to determine when to jet and when not to jet, with another input being the locations of interdental spacings. The following discussion provides more information on these inputs.

It is to be noted that cleaning of biofilm is much more efficient when a certain threshold velocity of fluid jetting is exceeded. This threshold velocity depends on the strength of the biofilm but is of the order of 20-30 m/s, and it is to be noted that biofilm in the interproximal area is less strong than on the teeth itself and is therefore easier to remove. Therefore, in addition to jetting when directed at the interdental spacing, and turning on/off when the head of the toothbrush is moving too fast or too slow, the system contains a pump and a means to operate in burst mode. The pump is operated with a certain frequency for a number of cycles and then switched off and in this way regulate the average flow rate. Also, as discussed above the jetting speed can take into account how fast the brush head is moving with respect to the teeth.

Regarding sensing of the movement of the head of the hybrid floss and toothbrush the sensor that is used to determine the direction and/or speed of the head and therefore also of the nozzle contained within the head (fluid delivery point) relative to the teeth is preferably contactless, i.e. there is no physical contact between the teeth and the actual sensor. There are several options for measuring the direction and optionally the velocity of the nozzle. The options are:

An accelerometer. This accelerometer is placed in the nozzle or in the tube, but also can be in the handle, close to the position of the hands.

An optical imaging device such as used in an optical mouse. The optical mouse sensor is preferably positioned in the nozzle, or can also be in the handle.

An optical correlator such as a laser sensor using self-mixing interference and/or the Doppler effect.

A sensor that is triggered by movement of the bottom part of the nozzle with respect to the floor.

Figure 9:
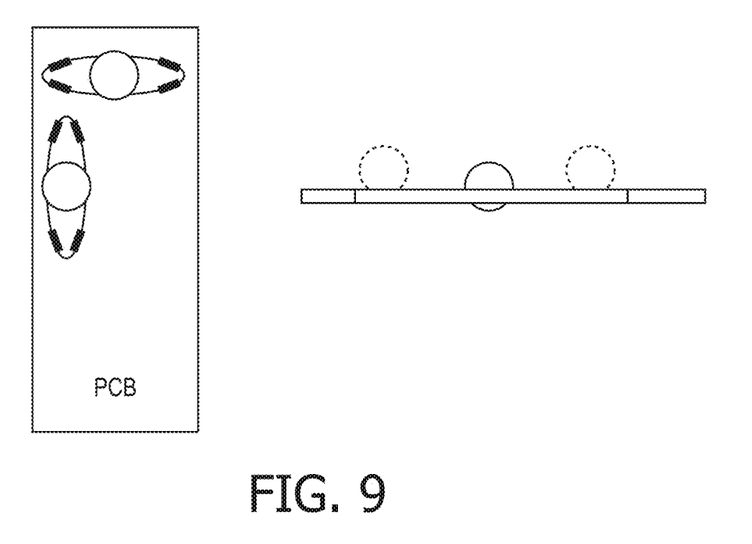
FIG. 9 shows an exemplar movement sensor.

An example of such is sensor is shown in FIG. 9. Included on the PCB are two conducting balls, similar to the balls that are found in the auto switch-off as used in irons. The balls are used to measure the presence of an acceleration as a momentary pulse. Due to the oval shape of the slits, the balls have to move upwards out of the plane of the PCD to move sideways. By adjusting the shape of the slit the required acceleration to trigger the contact can be tuned. In this way a simple motion sensor is provided. The switching action is interpreted by the microprocessor to determine the direction of the nozzle and the velocity. If necessary, only motion and not velocity can be detected, through for example use of switches, or strain gauges. This serves to identify one simple motion sensor, where accelerometers/gyros etc. can be utilized.

The pump is a piston pump with an operating frequency in the range of 10-100 Hz, and more preferably a range of 20-60 Hz. The nozzle of the jet unit can be in various positions on the brush head, in the middle (between the bristles), at the front (outside of the bristles) or at the back, in which case the brush head may need to be twisted when the fluid is used. And it is to be noted that fluid dosing can be liquid only, or a combination of liquid and gas, and where the liquid can be water. As discussed above, sensing technology is utilized to determine the position of the nozzle with respect to the interproximal area on the teeth.

In addition or alternatively to interrupting the jetting, the user can be provided with feedback that enables them to modify their tooth brushing protocol in order to better clean their teeth. Feedback to the user when the moving speed of the toothbrush is too large or too small can be provided in several ways. Vibrations are generated by a small motor with eccenter similar to mobile phones, or alternatively a light ring in the handle that changes colors can be used (for example, red to indicate too fast or too slow and green when in the range that can be handled by the pump for efficient cleaning with minimal water consumption).

Regarding movement of the hybrid floss and toothbrush system, there a maximum speed threshold above which water jetting is stopped, which can be calculated as detailed below. The flow rate can be adapted to the speed of movement as discussed below. The lower speed threshold can be calculated or set arbitrarily.

It is known that the biofilm removal scales with total liquid momentum, $P_{tot}$, hence $$V_{bf} = A_{bf} \cdot h_{bf} \approx K \cdot P_{tot}$$

Here $A_{bf}$ f is the area of biofilm removed and $h_{bf}$ f is the thickness of biofilm removed, which is ≈100 μm and K is a constant indicating the strength of the biofilm, which has been estimated for interproximal plaque to be K·1·10$^{-7}$ kg$^{-1}$m$^2$s and for tough plaque on the frontal teeth ≈1·10$^{-8}$ kg$^{-1}$m$^2$s. The total momentum can be written in $$P_{tot} = V M_1 = V \cdot \rho_1 \cdot Q_1 \cdot T_{tot}$$

With V the average liquid velocity (assumed to be constant over time for simplicity) in reality this velocity is varying with time, $\rho_1$ the liquid density, $Q_1$ the flow rate and $T_{tot}$ the total time the liquid is deposited on $A_{bf}$. For a jet like device the following can be used $$Q_1 = A_j \cdot V = \pi/4 d^2 V$$

The cleaning area when the jet is fixed at one position is of the order of the jet area, $A_j$, which is governed by the jet diameter, d. For a jet type of system the following applies $A_{bf} = f \cdot A_j$, with f a factor larger than 1. From the above equations a typical time to remove all biofilm can be derived, when the jet is hold stationary.

$$T_{tot} = f \cdot h_{bf}/(K \cdot \rho 1 \cdot V^2)$$

Figure 10:
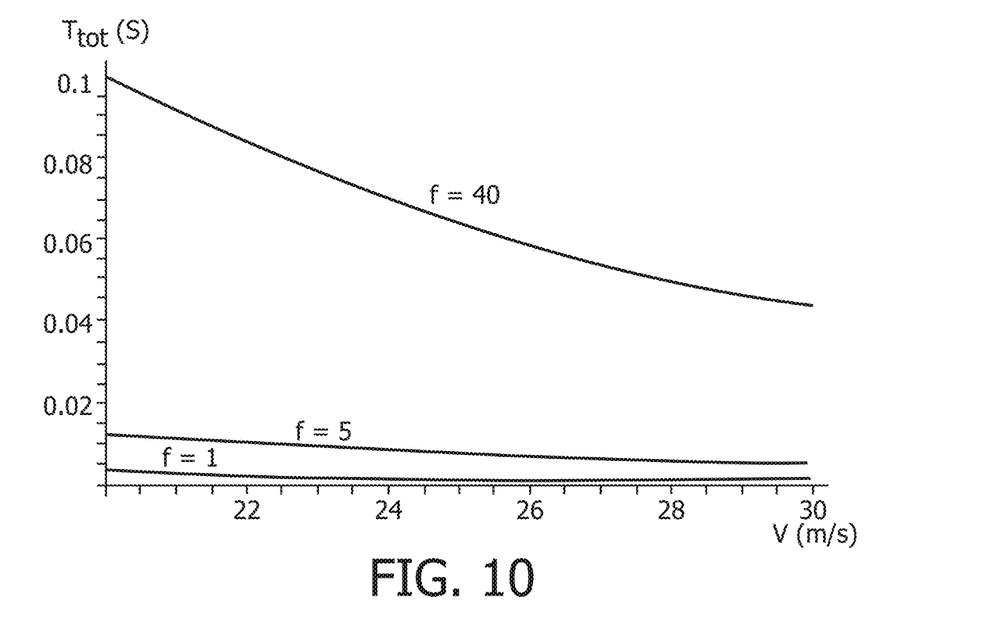
FIG. 10 shows exemplar cleaning times as a function of fluid velocity.

In FIG. 10, the time to clean the area of the jet is plotted for the case of interproximal plaque K≈1·10$^{-7}$ kg$^{-1}$ m$^2$s and it is to be noted that the times are very small, i.e. it is relatively easy to clean this area. It is to be noted that the difference between a jet and a spray will be that the factor f will increase to very large values of the order 40-80, causing a much longer time to clean, but still relatively small, within 0.2 sec.

Typically, the contact time of water on a specific spot is of the order of $$T_{con} \approx d_{cl}/U$$

In order that cleaning is accomplished in a single pass, the contact time needs to be larger than the required time to clean a spot. Hence from the above equations a value for the maximum velocity that can be used to clean a single spot can be derived. Note that $d_{cl}=\sqrt{f} \cdot d$ $$U < d \cdot K \cdot \rho_l V^2/(\sqrt{f} \cdot h_{bf})$$

Figure 11:
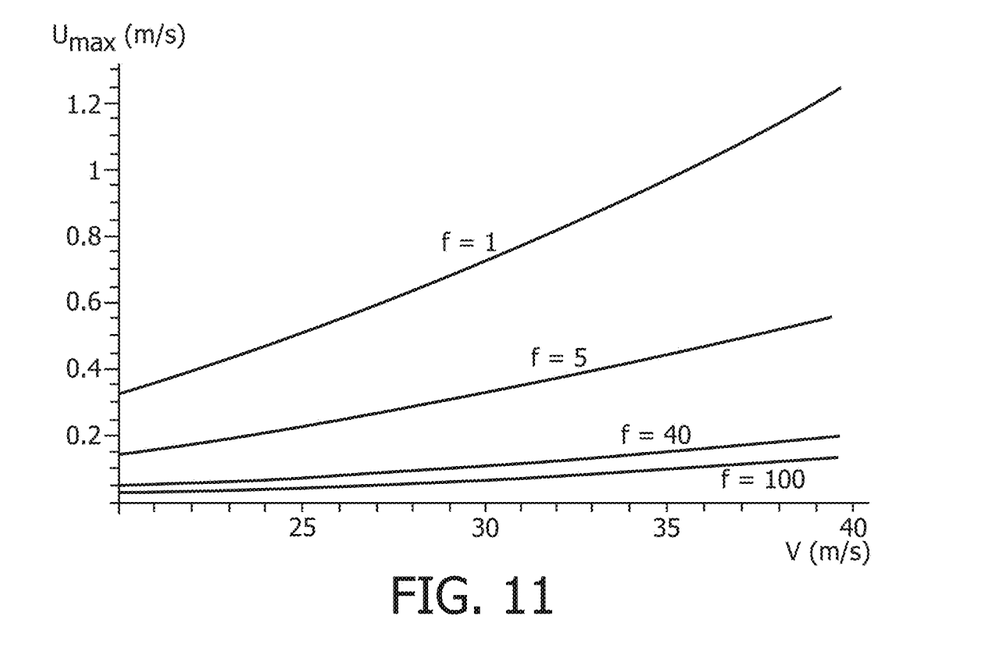
FIG. 11 shows exemplar maximum toothbrush head movement velocity as a function of fluid velocity.

FIG. 11 shows the maximum velocity for different average liquid velocity and cleaning fractions, with a nozzle diameter d of 0.8 mm and $K=1 \cdot 10^{-7}$ $kg_{-1}m^2s$. For a jet, i.e. small f, it can be seen that the maximum allowed U is quite large (e.g. 0.14 m/s for V=20 m/s and f=5).

It is to be noted that for a spray $f \approx 40\text{-}100$, it will take longer to clean and hence the maximum velocity required to clean must be smaller than the typical velocity which with the jet is moved over the substrate and hence no optimal cleaning is obtained if the user does not reduce the handle velocity.

The above analysis however shows how upper movement threshold speeds can be calculated above which jetting should be stopped, even when the nozzle jet is pointing at an interdental space or gum line.

In another exemplary embodiment, a computer program or computer program element is provided that is characterized by being configured to execute the method steps of the method according to one of the preceding embodiments, on an appropriate system.

The computer program element might therefore be stored on a computer unit such as a smartphone, laptop, tablet, or a computer unit within an oral cleaning device such as a toothbrush, which might also be part of an embodiment. This computing unit may be configured to perform or induce performing of the steps of the method described above. Moreover, it may be configured to operate the components of the above described system. The computing unit can be configured to operate automatically and/or to execute the orders of a user. A computer program may be loaded into a working memory of a data processor. The data processor may thus be equipped to carry out the method according to one of the preceding embodiments.

This exemplary embodiment of the invention covers both, a computer program that right from the beginning uses the invention and computer program that by means of an update turns an existing program into a program that uses the invention.

Further on, the computer program element might be able to provide all necessary steps to fulfill the procedure of an exemplary embodiment of the method as described above.

According to a further exemplary embodiment of the present invention, a computer readable medium, such as a CD-ROM, USB stick or the like, is presented wherein the computer readable medium has a computer program element stored on it which computer program element is described by the preceding section.

A computer program may be stored and/or distributed on a suitable medium, such as an optical storage medium or a solid state medium supplied together with or as part of other hardware, but may also be distributed in other forms, such as via the internet or other wired or wireless telecommunication systems.

However, the computer program may also be presented over a network like the World Wide Web and can be downloaded into the working memory of a data processor from such a network. According to a further exemplary embodiment of the present invention, a medium for making a computer program element available for downloading is provided, which computer program element is arranged to perform a method according to one of the previously described embodiments of the invention.

It has to be noted that embodiments of the invention are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. A single processor or other unit may fulfill the functions of several items re-cited in the claims. The mere fact that certain measures are re-cited in mutually different dependent claims does not indicate that a combination of these measures cannot be used to advantage. Any reference signs in the claims should not be construed as limiting the scope.

The invention claimed is:

1. A fluid based tooth cleaning system comprising:
   a holdable body configured to be coupled to a head;
   a fluid delivery unit configured to be coupled to a nozzle for emitting fluid, the nozzle being comprised within the head;
   at least one sensor configured to provide information relating to the head with respect to a user's teeth, wherein the at least one sensor comprises a movement sensor for determining velocity information relating to the velocity of the head with respect to the user's teeth, and the information comprises the velocity information; and
   a control unit configured to utilize the velocity information from the movement sensor to: enable the fluid delivery unit to emit fluid from the nozzle onto the user's teeth; and stop the fluid delivery unit from emitting fluid from the nozzle when a velocity of the head is greater than a first threshold level and/or is less than a second threshold level.

2. The fluid based tooth cleaning system according to claim 1, wherein the system comprises a user interface unit, and wherein the control unit is configured to control the user interface unit to output information to the user regarding movement of the head.

3. The fluid based tooth cleaning system according to claim 2, wherein the information output by the user interface unit comprises an output of information that the velocity of the head is greater than the first threshold level and/or is less than the second threshold level.

4. The fluid based tooth cleaning system according to claim 1, wherein the control unit is configured to utilize the information relating to the head with respect to the user's teeth to stop the fluid delivery unit from emitting fluid from the nozzle when the head is located at a position such that the fluid would be directed to hit a surface of the user's teeth.

5. The fluid based tooth cleaning system according to claim 1, wherein the control unit is configured to enable the fluid delivery unit to emit fluid from the nozzle with one or more adapted parameters of: speed of fluid jet, frequency of fluid jet, and duration of fluid jet.

6. The fluid based tooth cleaning system according to claim 1, wherein the holdable body comprises the fluid delivery unit, the at least one sensor, and the control unit, wherein the control unit is configured to utilize the information to enable the fluid delivery unit to emit fluid from the nozzle when the nozzle is at one location out of one or more specific locations with respect to the user's teeth.

7. The fluid based tooth cleaning system according to claim 1, wherein the head comprises bristles.

8. A non-transitory computer readable medium having stored
   a computer program element for controlling a fluid based tooth cleaning system according to claim 1, which when executed by a processor is configured to carry out the steps of:
   receiving the information from the at least one sensor relating to the head with respect to the user's teeth,
   wherein the information comprises the velocity information from the movement sensor and relating to the velocity of the head with respect to the user's teeth; and utilizing the velocity information to enable the fluid delivery unit to emit fluid from the nozzle onto the user's teeth; and
   stop the fluid delivery unit from emitting fluid from the nozzle when the velocity of the head is greater than the first threshold level and/or is less than the second threshold level.

9. The fluid based tooth cleaning system according to claim 1, wherein the at least one sensor comprises a position sensor configured to determine positional information relating to the head with respect to the user's teeth.

10. The fluid based tooth cleaning system according to claim 9, wherein the positional information comprises information relating to when the head is located at a position such that the nozzle is located adjacent to an interdental space of the user's teeth.

11. The fluid based tooth cleaning system according to claim 10, wherein the control unit is configured to enable the fluid delivery unit to emit fluid from the nozzle when the head is located at a position such that the fluid is directed to hit an interdental space of the user's teeth.

12. The fluid based tooth cleaning system according to claim 9, wherein the positional information comprises information relating to when the head is located at a position such that the nozzle is located adjacent to a gum line of the user's teeth, and the control unit is configured to utilize the information to enable the fluid delivery unit to emit fluid from the nozzle when the head is located at a position such that the fluid is directed to hit locations adjacent to the gum line of the user's teeth.

13. The fluid based tooth cleaning system according to claim 9, wherein the control unit is configured to utilize the positional information to determine a position of a first interdental space, and utilize the velocity information to determine when the head having moved away from that position returns to that position, and wherein the control unit is configured to activate the fluid delivery unit to emit fluid from the nozzle when the head has returned to the position of the first interdental space.

14. The fluid based tooth cleaning system according to claim 9, wherein the control unit is configured to utilize the positional information to determine a position of a first interdental space, and utilize the velocity information to determine when the head has moved to a position of a second interdental space adjacent to the first interdental space, and wherein the control unit is configured to activate the fluid delivery unit to emit fluid from the nozzle when the head is located at the second interdental space.

* * * * *